(12) United States Patent
Crinon (10) Patent No.: US 7,174,560 B1
(45) Date of Patent: Feb. 6, 2007

(54) METHOD OF SYNCHRONIZING EVENTS WITH A DIGITAL TELEVISION AUDIO-VISUAL PROGRAM

(75) Inventor: Regis J. Crinon, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 0 days.

(21) Appl. No.: 09/492,561

(22) Filed: Jan. 27, 2000

Related U.S. Application Data (60) Provisional application No. 60/121,811, filed on Feb. 25, 1999.

(51) Int. Cl.
*H04N 7/16* (2006.01)
*H04N 11/02* (2006.01)

(52) U.S. Cl. .................... 725/60; 725/139; 375/240.28
(58) Field of Classification Search ............ 348/423.1, 348/512, 518; 375/240.28; 725/60, 139
See application file for complete search history.

(56) References Cited

U.S. PATENT DOCUMENTS

| | | | |
|---|---|---|---|
| 5,481,543 A | 1/1996 | Veltman .................... | 370/94.1 |
| 5,521,927 A * | 5/1996 | Kim et al. .................. | 370/474 |
| 5,559,999 A * | 9/1996 | Maturi et al. ............... | 713/400 |
| 5,596,581 A | 1/1997 | Saeijs et al. ................ | 370/394 |
| 5,598,352 A | 1/1997 | Rosenau et al. ............ | 364/514 |
| 5,598,415 A | 1/1997 | Nuber et al. ................ | 370/474 |
| 5,650,825 A | 7/1997 | Naimpally et al. ......... | 348/465 |
| 5,699,392 A | 12/1997 | Dokic ......................... | 375/376 |
| 5,726,989 A | 3/1998 | Dokic ......................... | 370/509 |
| 5,774,664 A | 6/1998 | Hidary et al. .......... | 395/200.48 |
| 5,815,634 A | 9/1998 | Daum et al. ................... | 386/96 |
| 6,357,042 B2 * | 3/2002 | Srinivasan et al. ........... | 725/32 |

OTHER PUBLICATIONS

"Digital Storage Media Command and Control", ISO/IEC 13818-6 Specification, pp. 1-17; pp. 262-300; pp. 313-329; pp. 479-487.
"Synchronization of HTML and Java Content with MPEG and IP Transport", Aninda Das Gupta, document ATSC DIWGO68, made available on the e-mail reflector of Feb. 18, 1999.
"ATSC" Data Broadcast Specification ATSC T3S13 draft specification VO.19, Jan. 11, 1999, pp. 1-77.
McKinney and Hopkins, "ATSC Digital Television Standard," Advanced Television Systems Committee, Doc A/53, Apr. 12, 1995, Sep. 16, 1995.

* cited by examiner

*Primary Examiner*—Andrew Y. Koenig
(74) *Attorney, Agent, or Firm*—Chernoff, Vilhauer, McClung & Stenzel (57) ABSTRACT

A method and apparatus for synchronizing an event produced at a digital television receiver with an instant of a transmitted video, audio, or data element of a digital television program is disclosed. In a digital television system, a system time clock generates a timeline that is used to synchronize the presentation of the video, audio, and data elements of the television program. An application time is used in program production to synchronize instants of the several program elements. To synchronize a receiver generated event with an instant of a transmitted video, audio, or data program element, samples of the application time are transmitted to a receiver in a synchronized data service. A reconstructed application time is generated at the receiver as a function of the current system time, the application time sample, and the presentation time stamp of the data access unit in which the application time sample was transmitted. The presentation time of the program instant is associated with an application time correlating the event and the instant. The correlating application time is transmitted to the receiver as part of a synchronous or asynchronous data service and the event is instigated when the reconstructed application time corresponds to the correlating application time. A clock for generating a reconstructed application time synchronized to the system time is also disclosed.

9 Claims, 6 Drawing Sheets

METHOD OF SYNCHRONIZING EVENTS WITH A DIGITAL TELEVISION AUDIO-VISUAL PROGRAM

CROSS-REFERENCE TO RELATED APPLICATION

This application claims the benefit of U.S. Provisional Application No. 60/121,811, filed Feb. 25, 1999.

BACKGROUND OF THE INVENTION

The present invention relates to digital television and, more particularly, to a method and an apparatus for synchronizing events originating at a digital television receiver with instants of the audio, video, or data elements of a digital television program.

Digital television (DTV) affords the opportunity to augment the basic audio and video content that characterizes an analog television program. For example, a DTV program may include multiple audio and video elements. A DTV transmission may also include a number of data elements to provide ancillary services in conjunction with the visual and audio elements of a program. In addition, applications residing at the DTV receiver can generate events related to transmitted television program elements or ancillary services. An event refers to some action or behavior initiated by the DTV receiver. Examples of events include displaying a graphic button, generating a sound, or rendering data, which may have been transmitted to or generated at the receiver.

The scope of the ancillary services and applications that might be provided with DTV is largely undefined. The ATSC DIGITAL TELEVISION STANDARD, Advanced Television Systems Committee, Doc A/53, 12 Apr. 1995, 16 Sep. 1995, incorporated by reference herein, provides for program subtitles and a program guide to be included in a DTV system. Program subtitles are analogous to the closed the caption and emergency message services provided with NTSC (analog) television broadcasts. The program guide contains information about current and future programs.

The ATSC DATA BROADCAST SPECIFICATION, Advanced Television Systems Committee, ATSC T3-504, Jul. 30, 1999, incorporated by reference herein, is a draft ATSC standard that defines data transmission that is compatible with the digital multiplex, MPEG-2 bit streams of the DTV system. Further, it specifies mechanisms necessary to allow applications resident at the receiver to be associated with transmitted data elementary streams. Each data elementary stream is delivered in MPEG-2 transport stream packets referenced by a unique MPEG-2 transport stream packet identifier (PID). The PID is used to identify the elementary data streams included within the DTV transport bit stream. The specification does not attempt to define the nature of services and applications that might be provided with the DTV system, but does anticipate that many of these services and applications will be synchronized to some extent with the video and audio elements of a program. The specification provides a suite of packetization formats, error protection schemes, and communication protocols for the delivery of asynchronous, synchronous, and synchronized, streaming and non-streaming data services to facilitate these ancillary services and applications.

In the DTV system, samples of a system time generated by a system clock are transmitted to a receiver. The system time is recovered at the receiver and synchronized to the timeline generated at the transmitter. The common time base for the encoder at the transmitter or emission station and the decoder at the receiver facilitates synchronization of the presentation of the video, audio, and ancillary data service elements of a television presentation. The encoder periodically samples the value of the system time generated by the 27 MHz. system clock and includes the sample values (42 bits per sample) as program clock references (PCR) in the transport stream data packets of one of the elementary streams (typically, the video elementary stream). At the receiver, the decoder uses the PCRs recovered from the data stream to construct the receiver's version of the system clock and synchronize it with the encoder's system clock.

The encoder also associates a presentation time stamp (PTS) and, optionally, a decoding time stamp (DTS) with each of the data access units within the elementary data streams. The PTS indicates the system time moment relative to the system timeline provided by the PCRs at which presentation is to occur. Typically, presentation refers to display of video and audio data, but presentation may refer to some other action related to the data in the data access unit. The DTS indicates the system time at which decoding of the data in the data access unit is to be undertaken. A DTS may not be provided with every data access unit, but in some cases may be inferred from the PTS assigned to another data access unit. In other cases, a DTS may be inferred from the PTS of the data access unit and a delay value either transmitted or predetermined indicating an elapsed time between the initiation of decoding and presentation. Therefore, the exact system time at which the data are to be decoded and presented so that the data are properly synchronized with a program video frame, video field or other instant of a program element is specified in the data elementary stream packets.

The system clock references and the time stamps used to synchronize the decoding and presentation of program elements in the transmitted data stream cannot easily be used to synchronize events or program elements outside the context of the data stream. The system clock is basically a counter and does not produce a value expressing time in any real sense. Further, the system clock time samples are inserted at the multiplexer that encodes the transport stream and the value of the system time at an instant of an audio, visual, or data program element is not known until the data for that instant is encoded and inserted in the transport data stream. As result, an author has no way of determining the appropriate system time corresponding to an instant of an audio, video, or data element of a program at the time of program authoring. Furthermore, many applications that might be resident at the receiver may have been authored to operate with a coarser time resolution than provided by the 27 MHz. system clock.

In program production, editors use timecode recorded on the videotape or other storage medium as an application clock to synchronize video, audio, and data instants from several sources. A common timecode format used in program production is the SMPTE (Society of Motion Picture and Television Engineers) 12M timecode. The SMPTE timecode format effectively applies an electronic address, one frame in duration, to each frame of the videotape. The video editor identifies an instant of the video content by a value of the SMPTE timecode corresponding to that instant. In a post production environment, video and audio from several sources can be synchronized at a particular instant by referencing a particular SMPTE timecode value. While the SMPTE 12M timecode provides resolution to one frame, other timecodes may provide resolution to a video field or even finer.

Similarly, MPEG-4 (CODING OF MOVING PICTURES AND AUDIO, ISO/IEC JTC1/SC29/WG11 N2995, International Standards Organization) content production utilizes an authoring system working with a timeline to synchronize various MPEG-4 elementary streams. Like SMPTE timecodes, the MPEG-4 timeline (also called the MPEG-4 scene time) will be sampled and captured as application time clock references in the authoring system.

If the application timecodes were available at the receiver and synchronized to the presentation of the elements (i.e. access units) of the transmitted program elements, an author of an ancillary service could associate an event to an instant of a program element with the timecode. Then an application at the receiver could instigate the event in synchronization with presentation of the instant of the transmitted program element. However, the DTV system does not provide for transmission of a timecode in synchronization with the transmitted program or for construction of a synchronized application time clock at the DTV receiver.

The ATSC DATA BROADCAST SPECIFICATION provides for downloading data in a DTV system in accordance with the protocols of ISO/IEC 13818-6, INFORMATION TECHNOLOGY—GENERIC CODING OF MOVING PICTURES AND ASSOCIATED AUDIO: DIGITAL STORAGE MEDIUM—COMMAND AND CONTROL, ISO/IEC JTC1/SC29/WG11MEPEG96/N1300pl, July, 1996. The digital storage media-command and control (DSM-CC) standard provides a protocol toolkit for data transmission. The DSM-CC standard provides a temporal addressing method called Normal Play Time (NPT) for associating the MPEG-2 program clock references (PCRs) of the DTV data stream with "VCR" like application time stamps referred to as Normal Play Time (NPT) time stamps. In the DSM-CC framework, PCRs (samples of the system time) are inserted into the payload of data packets containing NPT reference descriptors (samples of the application time) so the system and application times can be associated. The Normal Play Time can be reconstructed at the receiver from the NPT reference it descriptors and locked to the system clock derived from the PCRs. The NPT time stamp is transmitted asynchronously to the receiver at some time before the event to identify the system time at which the event is to occur. An event is triggered when the system time matches the NPT time stamp for the event. Unfortunately, this method of transmitting a synchronizing application time moment requires that PCRs be generated and inserted into DSM-CC sections before or when the section enters the program multiplexer or encoder. Generating and inserting a PCR at an arbitrary location in the bitstream is a difficult task for an MPEG-2 multiplexer. In addition, the DSM-CC NPT reference descriptors and stream event descriptors containing the NPT time stamp, must be conveyed in DSM-CC section structures which requires an additional packet identifier (PID) to identify the transport packets carrying these descriptors in the DTV transport bit stream. A typical receiver can filter a limited number of PIDs and adding PIDs may complicate the receiver and increase its cost.

What is desired, therefore, is a method and apparatus for synchronizing receiver instigated events to instants of the transmitted video, audio, or data elements of a television program.

SUMMARY OF THE INVENTION

The present invention overcomes the aforementioned drawbacks of the prior art by providing a method of synchronizing an event to an instant of a video, audio, or data element of a digital television program comprising the steps of generating a reconstructed application time including an application time moment that is a function of a current moment of a system time, a sample application time moment, and a sample moment of the system time associated with the sample application time moment; associating the event and the instant of the program element with a correlating application time, associating the correlating application time with a presentation moment of the system time for the instant, and instigating the event at a reconstructed application time corresponding to the correlating application time. The application time used to synchronize instants of the various elements of the program during production is reconstructed at the television receiver and temporally correlated or synchronized to the system time that synchronizes the presentation of instants of the transmitted elements of the DTV presentation. A moment of application time correlating a receiver instigated event and an instant of another program element is delivered to the receiver with an ancillary data service. Since the reconstructed application time and system time are synchronized, instigating the event at this correlating moment synchronizes it to the presentation of the instant of the program element. The sample application time and the correlating application time may be embedded in a single synchronized data elementary stream. Alternatively, the correlating application time may be included in a separate asynchronous data stream permitting the data representing the event to be delivered periodically as pre-cached or pre-loaded data. In either case, events are initiated at the receiver by reconstructing the application time and instigating the event at a specified moment of the reconstructed application time.

A second aspect of the invention is an apparatus for synchronizing an event to an instant of a synchronized video, audio, and data program element comprising a system clock generating system time; an application clock generating application time; a sampler selecting a moment of the application time as an application time sample; an editor designating a correlating application time associating the event and the instant; a first data unit generator generating a first data unit comprising the application time sample and a first data unit presentation moment of system time; a second data unit generator generating a second data unit comprising the correlating application time; a third data unit generator generating a third data unit comprising the instant and a third data unit presentation moment of system time, the third data unit presentation moment associated with the correlating application time; a depacketizer to recover the application time sample, the first data presentation moment, the correlating application time, the instant and the third data unit presentation moment from the first, second, and third data units; an application time recovery unit generating a reconstructed application time including a moment equal to a function of the application time sample, the first data unit presentation moment, and a current system time moment; a presentation unit to present the instant at the third data unit presentation time, and a presentation engine to instigate the event when the reconstructed application time corresponds to the correlating moment. The apparatus can be constructed to convey the correlating application time moment and the application time samples in separate data streams. In another embodiment of the apparatus, the correlating moment and time samples are transmitted to the receiver in a single synchronized data stream.

Additional aspects of the invention include a method and apparatus for reconstructing the application time at the television receiver and synchronizing the reconstructed application time to the system time of the DTV system. The application time is reconstructed and synchronized to the system time by the steps of generating the application time; generating the system time; selecting a reference moment of the application time; incorporating the reference moment in a data access unit having a data access unit presentation moment of system time; recovering the reference moment and the data access unit presentation moment from the data access unit; and adjusting a clock to produce a moment of the reconstructed application time equal to a function of the reference moment, the data access unit presentation moment, and a current moment of system time. Generating an application time at a DTV receiver that is locked to the system time permits an event to be instigated at the receiver by an application responding to a timecode provided by a program editor that specifies the application time moment at which the event is to occur.

To synchronize a receiver generated event to an instant of an audio, visual or data program element, the author may designate a correlating moment of application time for the event and the instant. The correlating application time moment is transmitted to the receiver in a synchronized or in an asynchronous data service. The synchronization provided by timecodes specifying moments of application time is destroyed by the DTV encoding process. However, the system time regulating presentation of an instant and the application time related to that instant can be associated by pushing the instant to the encoding multiplexer according to a schedule of application time or using the timecodes to synchronize the application clock. Instigation (triggering) of the event at the reconstructed application time corresponding to the correlating moment synchronizes the event with the presentation of the program instant.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

The production of a digital television (DTV) program involves the creation and combination of video elements, one or more audio elements and, optionally, related data services and applications. In the post production process, original optical source video from several sources may be combined, modified, and electronically generated video and audio added to produce the final release version of the production. Synchronization is essential to combining images, audio, and data from multiple sources. A timecode is used to synchronize the various elements of the program during its production. Video content is obtained from optical sources or generated electronically. If the original optical source footage is recorded on video tape, the timecode may be generated by the video camera and applied to the tape at the time of shooting. On the other hand, the timecode may generated by a separate timecode generator and added to the tape or other storage medium during editing. If the original footage is recorded on film, the timecode is added after the film has been converted to videotape for editing.

The SMPTE (Society of Motion Picture and Television Engineers) 12M timecode is commonly used in video program production but other timecodes specifying the timing of events against an application timeline are used. The SMPTE timecode applies an electronic address, one frame in duration, to each frame of the videotape. The timecode takes the form of an eight digit, twenty four-hour application time clock generating an application timeline with the timecode values specifying frames, seconds, minutes, and hours. A video editor (not illustrated) can specify the timing of an occurrence of a video, audio or data instant (for example, a video frame or field, or a sound) by designating the application time (specified by the timecode) of the occurrence of the instant. Likewise, the synchronized presentation of more than one instant can be established by designating a common or correlating moment of application time for the presentation of the multiple instants. In the present invention, the application time is reconstructed and available at the DTV receiver and synchronized to the system time that regulates the presentation of instants of the elements of a program. An application at the receiver can instigate an event in synchronization with an instant of a program element by responding to a correlating application time moment designated by the program author as associating the event and the instant. An event refers to some action or behavior initiated by the receiver, including, for example, displaying a graphic button, generating a sound, rendering data which may have been transmitted to or generated locally at the receiver or passing data to some peripheral device.

Figure 1:
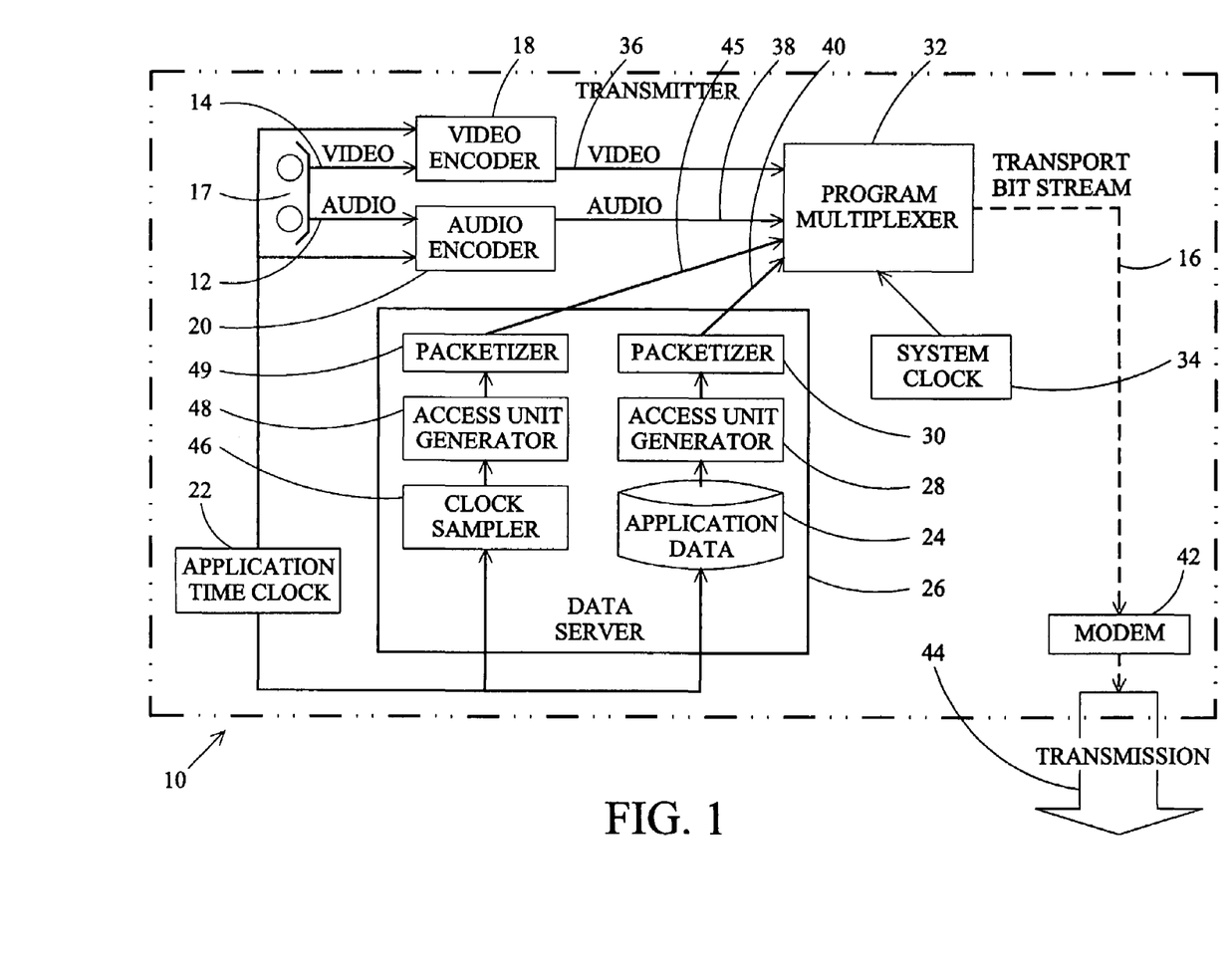
FIG. 1 is a block diagram of a digital television transmitter or emission station implementing transmission of application time samples and correlating application times in separate data streams.

A DTV system comprises a transmitter or emission station and a receiver. The digital television system is described by the ATSC DIGITAL TELEVISION STANDARD, Advanced Television Systems Committee, Doc A/53, 12 Apr. 1995, 16 Sep. 1995, incorporated by reference herein. A block diagram of a DTV transmitter or emission station 10 is illustrated in FIG. 1. For simplicity, the illustrated transmitter 10 is transmitting a single DTV program comprising single audio 12 and video 14 elementary streams and two ancillary data elementary streams 40 and 45. An actual emission station may transmit several programs simultaneously with each program comprising a plurality of elementary streams for each type of program element. In the transmitter 10, the elementary data streams for the video 14 and audio 12 program elements are compressed, formatted, packetized and multiplexed into a single transport bit stream 16. The digital television system employs compression techniques from the MPEG-2 toolkit and the video stream syntax specified in the MPEG-2 standard, ISO/IEC 13818-1, INFORMATION TECHNOLOGY—GENERIC CODING OF MOVING PICTURES AND ASSOCIATED AUDIO INFORMATION, International Standards Organization, 1995. Audio coding is in accordance with the DIGITAL AUDIO COMPRESSION STANDARD (AC-3), Advanced Television Systems Committee, Doc A/52, 16 Nov. 1994, 20 Dec. 1995.

Data related to ancillary data services are also transmitted in the transport bit steam 16. Ancillary data services can include control data, conditional access data that scrambles the program unless the decoder has the proper key, and data associated with program audio and video services, such as a program guide, emergency messages, and closed captioning services. In addition to the basic ancillary data services, the ATSC standard envisions transmission of additional ancillary or private data services. The ATSC DATA BROADCAST SPECIFICATION, Advanced Television Systems Committee, ATSC Doc. T3-504, Jul. 30, 1999, is a draft ATSC standard defining specifications of data for compatible transmission with the digital multiplex, MPEG-2 bit streams of the DTV system. Further, it specifies signaling mechanisms necessary to allow applications to be associated with the data elementary streams of a program. The draft specification anticipates that many ancillary services and applications will be synchronized to some extent with the audio or visual elements of a transmitted DTV program. For this purpose, the specification defines packetization, error protection schemes and protocols for the delivery of asynchronous, synchronous, and synchronized, streaming and non-streaming data elementary streams to support these services and applications.

At the transmitter 10, the source video 14 and audio 12 data streams are obtained from their respective media sources. For example, a videotape machine 17 is a typical source of the video 14 and audio 12 elements of a television program. The video 14 and audio 12 source data is transferred to the video 18 and audio 20 encoders according to an application time schedule established by the author. Application time is a time line generated by an application time clock 22 sampling values from the timecode stored with the data for the program element during editing. In the video 18 and audio 20 application encoders, the data is compressed, encoded, and formatted to reduce the data that must be transmitted.

The application data 24 for an ancillary data service elementary stream is obtained from a source and may be stored in a data server 26. The ancillary data service elementary stream data is pushed to a data access unit generator 28 which generates data access units according to a buffer model for the decoder in the DTV receiver. The data access units are packetized by a packetizer 30 according to one of the protocol encapsulation, packetization, synchronization, and protection layers defined in the ATSC DATA BROADCAST SPECIFICATION. Data related to synchronous or synchronized data services are pushed to the program multiplexer 32 by the data server 26 at application times designated by the author and specified by the application timecodes for the program.

In the program multiplexer 32, the several packetized elementary streams are multiplexed into a single transport bit stream 16 and timing information is added to the transmitted video, audio, and data program elements to preserve the synchronization of the various program elements lost in the multiplexing operation. A 27 MHz. system clock 34 is sampled and the samples (program clock references or PCRs) are included in transport data packets of the transport bit stream 16 (typically the transport data packets for the video element of the program) before transmission. The PCRs are used to reconstruct a system clock at the receiver that generates a system timeline synchronized to the system timeline produced by system clock 34 at the emission station 10.

A presentation time stamp (PTS) and, optionally, a decoding time stamp (DTS) is associated with each of the data access units within the elementary data streams by the program multiplexer 32. The PTS indicates the system time moment relative to the system timeline provided by the PCRs at which presentation is to occur. Typically, presentation refers to display of video and audio data, but presentation may refer to some other action related to the data in the data access unit. The DTS indicates the system time at which decoding of the data in the data access unit is to be undertaken. A DTS may not be provided with every data access unit, but in some cases may be inferred from the PTS assigned to another data access unit. In other cases, a DTS may be inferred from the PTS of the data access unit and a delay value either transmitted or predetermined indicating an elapsed time between the initiation of decoding and presentation. Therefore, the exact system times at which the data are to be decoded and presented so that presentation of the instant is properly synchronized with other elements of the program are specified in the data elementary stream packets.

While the timecodes providing synchronization of the instants of the various program elements are not transmitted and the synchronization provided by the timecodes is destroyed, an association between the presentation of the instant is retained. Pushing the data for an instant of a program element to an appropriate encoder at an application time schedule adjusted for the time required to encode the data associates the presentation time specified by the PTS to the application time for the instant. Likewise, synchronizing the application clock to the values of application time specified by the timecodes before encoding can provide an association between the moment of presentation of the instant and the original application time for that instant.

The transport bit stream 16 is passed to a modem subsystem 42 for modulation and transmission. In terrestrial broadcast television the modem subsystem 42 may be a radio frequency transmission system which uses the digital data in the transport bit stream to modulate a transmitted signal 44. Other modem systems could be used for satellite or cable transmission and, at least some systems are expected to include two-way communication for interactivity.

Figure 2:
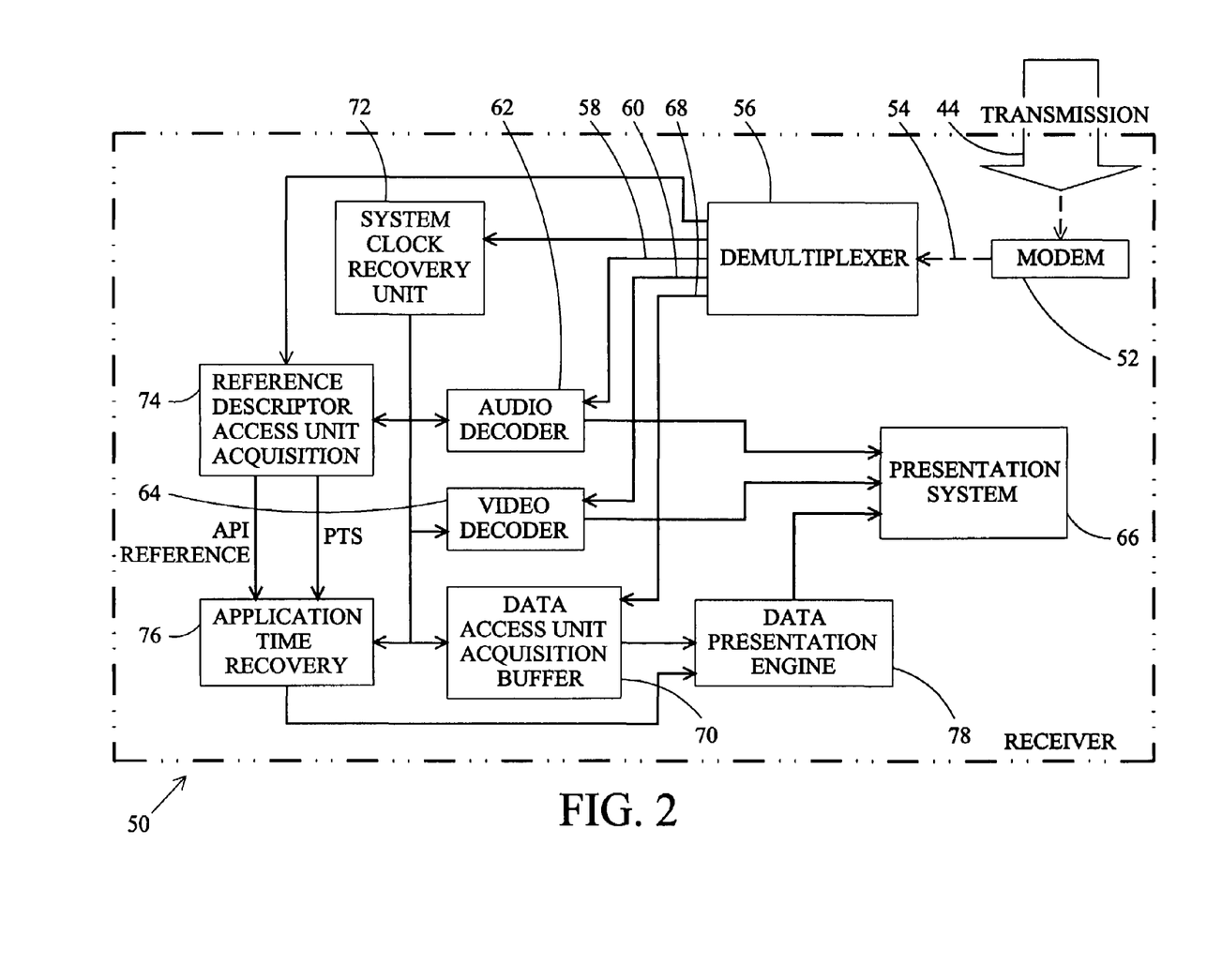
FIG. 2 is a block diagram of a digital television receiver instigating synchronized events from application time samples and correlating application times in separate data streams.

Referring to FIG. 2, the transmitted signal 44 is received at a receiver 50 where the signal is demodulated in a modem subsystem 52. The resulting transport bit stream with error signaling 54 is forwarded to the transport depacketization and demultiplexing subsystem (demultiplexer) 56 where the elementary bit streams for each of the program elements are recovered. The audio 58 and video 60 data access units are decoded in their respective audio 62 and video 64 decoders and the data is forwarded to the presentation subsystem 66 for presentation to the user. The data access units of the ancillary data service elementary stream are passed to the data access unit decoder 70 before being rendered in the data presentation engine 78. The data presentation engine 78 may send the data to the presentation subsystem 66 for display to the user or the data may be used in some other way, for example downloaded to a peripheral device for performing some function.

In a system clock recovery subsystem 72, the PCRs are recovered from the data stream and are used in a phase lock loop mechanism to reconstruct the system time clock 34. In other words, the output of system clock recovery subsystem 72 is a system timeline synchronized to the timeline produced by the system clock of the transport stream encoder or program multiplexer 32 of the transmitter 10. Decoding and display of access units for synchronized data services recovered from the transport data stream 16 occurs when the system time moment specified by the DTS or PTS, respectively, of the data access unit corresponds to a system time moment generated by the system clock.

Figure 5:
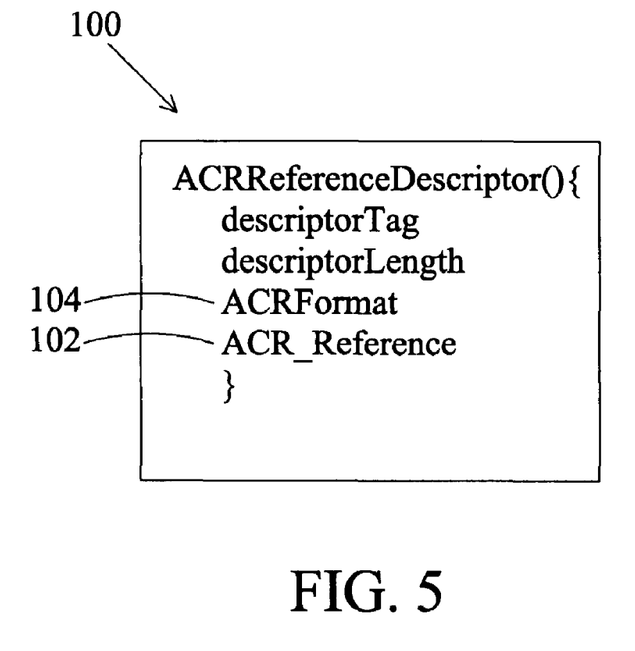
FIG. 5 is an illustration of a reference descriptor for specifying a sample of application time.
Figure 6:
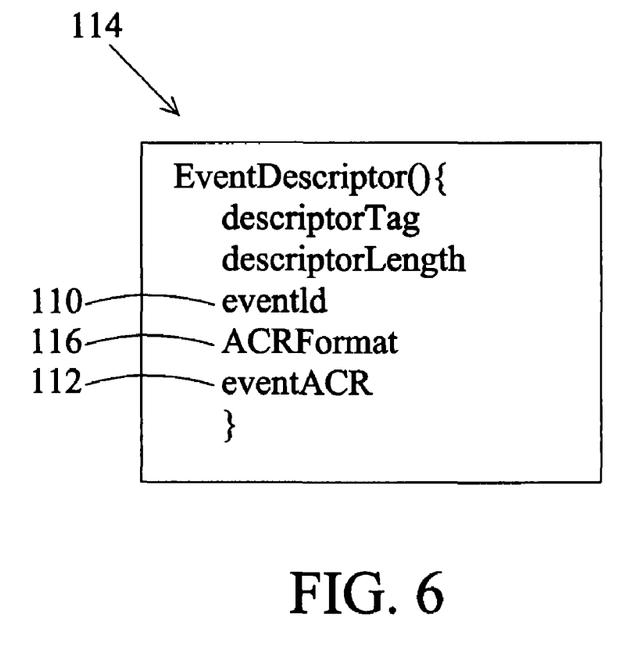
FIG. 6 is an illustration of an event descriptor specifying a correlating application time of an event.

Referring again to FIG. 1, in a first embodiment of the present invention samples from an application time clock 22 are included in a synchronized data stream 45 that is separate from the data stream 40 in which data for ancillary data services, including the receiver resident application, is transported. A clock sampler 46 samples the application time produced by the application clock 22. The sample value is adjusted to take into account the fixed delay introduced by the packetization process of the data server 26. Each resulting sample application time moment or application clock reference is captured in an application clock reference (ACR) descriptor 100, as illustrated in FIG. 5. A data access unit generator 48 generates data access units containing the application clock references. When the application clock references are provided in a separate data elementary stream, the ACR reference descriptor 100 may be the only payload of the data access unit. The data access unit may be transmitted by means of packetized elementary stream (PES) packets (in the case of a streaming, synchronized data service) or synchronized DSM-CC sections as described in ISO/IEC 13818-6, INFORMATION TECHNOLOGY-GENERIC CODING OF MOVING PICTURES AND ASSOCIATED AUDIO: DIGITAL STORAGE MEDIUM—COMMAND AND CONTROL, ISO/IEC JTC1/SC29/WG11MEPEG96/N1300pl, International Standards Organization, July, 1996 (in the case of a non-streaming, synchronized data service). The value of the ACR descriptor 100 specifies the value of the sample application time moment to be associated with the presentation time moment (the PTS) of the synchronized data access unit that contains the descriptor. When the ACR descriptor 100 is included in a PES packet, the five byte PTS field (including the marker bits) is included in the header of the PES packet and the data access unit including the ACR descriptor 100 is conveyed in the payload bytes of the PES packet. When the DSM-CC section is utilized, the ACR descriptor 100 is conveyed in the downloadDataBlock message of the section payload and the five byte PTS field (including the marker bits) is included in the dsmccAdaptationHeader structure of the dsmccMessageHeader of the DSM-CC section, as specified in Final Draft Amendment to ISO/IEC 13818-6, Document ISO/IEC JTC 1/SC 29/WG 11/N3052, December 1999. A packetizer 49 packetizes the data access units containing the application clock references and pushes the packets to the program multiplexer 32 at the application time specified in the data access unit. As it does with other synchronized data, the program multiplexer generates a PTS that is added to the data packet. The data server 26 and program multiplexer 32 form a generator of data units containing a sample application time or application clock reference associated with a corresponding system time moment from the 90 kHz. resolution portion of the system timeline. The 27 MHz. resolution of the system clock is reduced to a 90 kHz. resolution because the PTS field captures only the 33 most significant bits of the 42 bit PCR field produced by the system clock 34. While the data streams making up the elements of a program are illustrated as separate streams in FIG. 1, the separation of the streams in the program multiplexer 32 is a logical separation and the application time samples could be inserted into the packets of one of the other streams, for example the video stream.

Referring again to FIG. 2, the transport bit stream containing the application time clock references is transmitted 44 to the receiver 50 where a reference descriptor access unit acquisition subsystem 74 recovers the data access units containing the ACR references 102 and their respective PTSs. The PTS and the application time clock reference (ACR_Reference) 102 in an ACR reference descriptor 100 are used by an application time recovery system 76 to reconstruct the current application clock and lock it with the system time. The application time may be determined, for example, by the following equation:

$$ACR_K = \text{CONVERT}\ ((STC_K/300) - PTS) + ACR\_\text{Reference}$$

where:

$ACR_K = k^{th}$ value of application time $STC_K$=the current moment of system time (reconstructed at the receiver from the 42-bit PCRs (27 MHz. resolution) transmitted in one of the elementary streams of the program PTS=the presentation time stamp (33-bits) of the data access unit that includes the associated sample application time moment (ACR_Reference)

ACR_Reference=the application clock reference or sample application time moment contained in the data access unit having a system presentation moment of PTS The function CONVER( ) maps the 90 kHz. portion of the system time to the application time. The CONVERT function is characterized by the field ACR_Format 104 in the ACR descriptor 100, as illustrated in FIG. 5. The conversion performed by the CONVERT( ) operator may include a change in resolution as the application clock reference may be of lower resolution than the 90 kHz. resolution provided by the PTS. If the 90 kHz. system time is a multiple integer of the application time unit frequency, this operation can be implemented using a simple right-shift bit operation. If the application time clock resolution or application time unit frequency is the conventional video frame resolution (29.97 Hz.), the CONVERT( ) operation is a division by 3003 (or 0x0BBB in hexadecimal). To engage the proper CONVER( ) operation, the value of the ACR_Format field 104 in the descriptor 100 signals the resolution of the application clock references.

Figure 7:
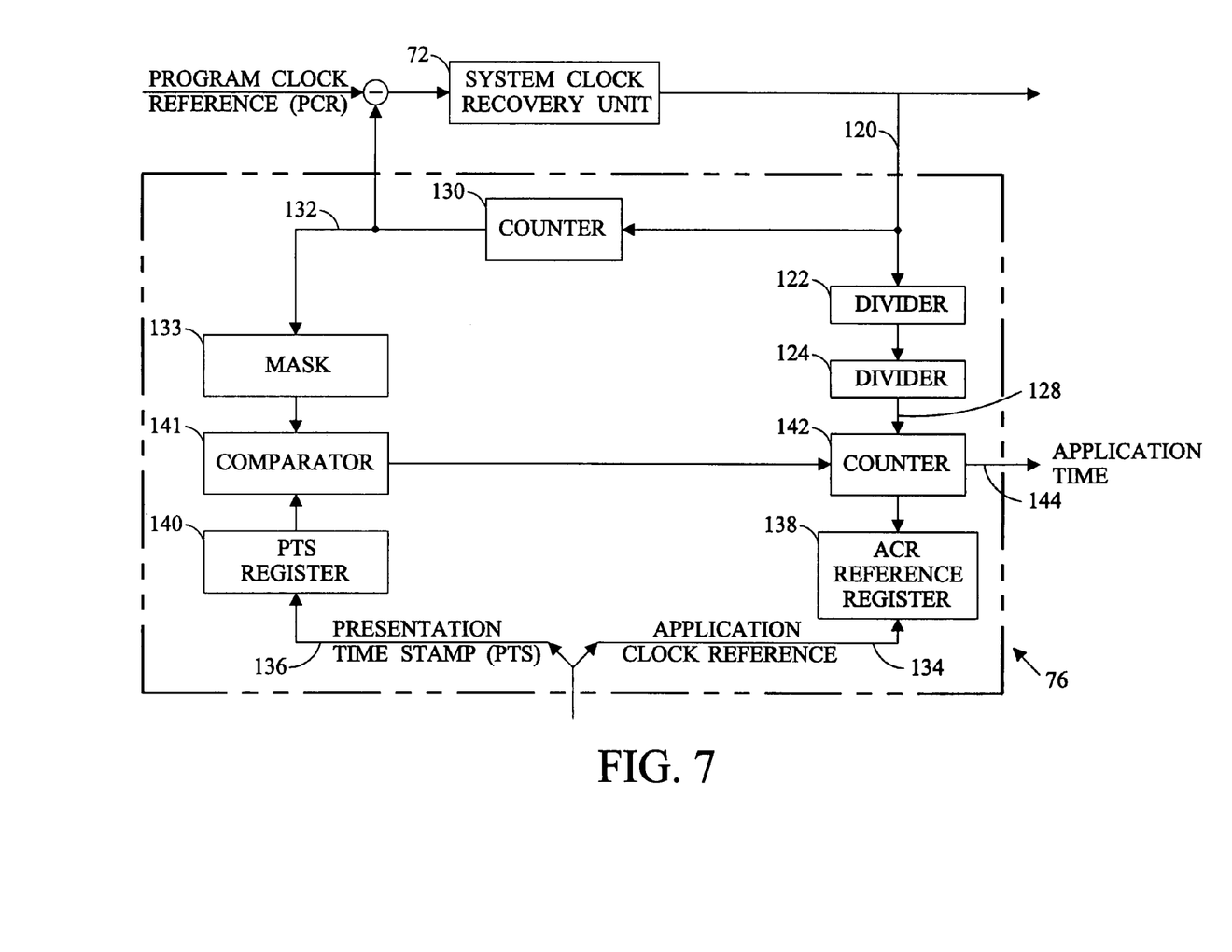
FIG. 7 is a block diagram of an application time recovery unit of a DTV receiver.

The application time recovery unit 76 may be implemented in software or in hardware. A block diagram of a hardware implementation of the application time recovery unit 76 is illustrated in FIG. 7. An output of the system clock recovery unit 72 is an analog signal 120 with a beat frequency equal to the system time resolution (27 MHz.). This output is input to a divider 122 and divided by 300 to produce a signal with a frequency of 90 kHz. The output of the divider 122 is divided again in a divider 124 by a divisor sufficient to perform the CONVERT ( ) function. The output of the divider 124 is a trigger signal 128 with a frequency equal to the time unit frequency of the application clock.

The output of the system clock recovery unit 72 is also input to a counter 130 which produces samples of the system time 132 at 90 kHz. The samples of the system time 132 are input to a mask 133 that retains the most significant 33 bits of the sample system time. The most significant 33 bits of a system time moment is equivalent to the PTS for that moment.

Figure 4:
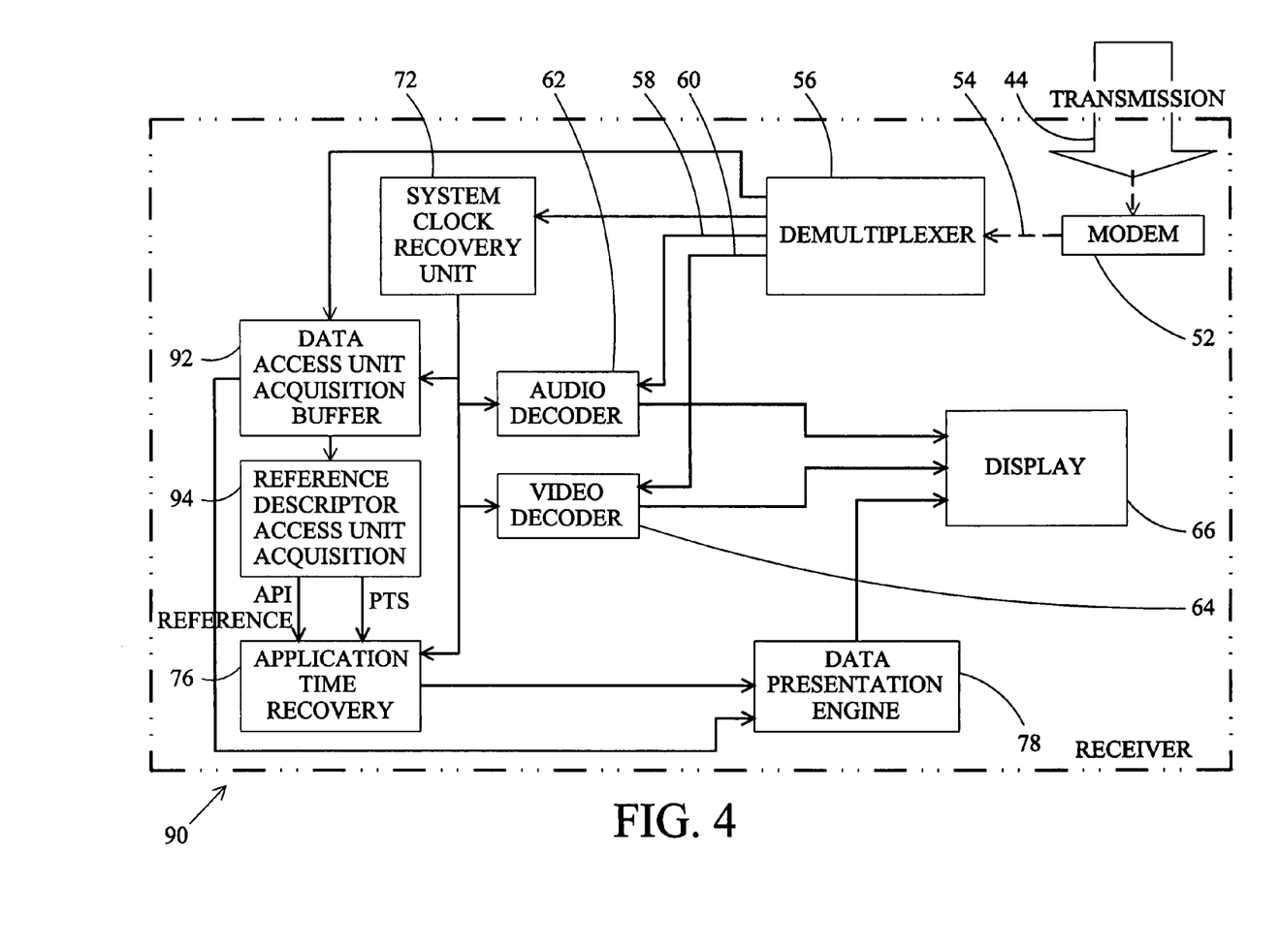
FIG. 4 is a block diagram of a digital television receiver instigating synchronized events from application time samples and correlating application times transmitted in a single data stream.

An application time sample moment specified by an application clock reference 134 and an associated PTS 136 are recovered from the PES packet or DSM-CC section in which they were transmitted by the reference descriptor acquisition unit 74 (as illustrated in FIG. 2) or reference descriptor acquisition unit 94 (as illustrated in FIG. 4). The application clock reference 134 and the associated PTS 136 are input, respectively, to the ACR_Reference register 138 and PTS register 140. The associated PTS 136 in the PTS register 140 is compared in a comparator 141 to the 33 most significant bits of the system time sample produced by the mask 133. If the values are equal, the content of the ACR_Reference register 138 is loaded into the counter 142 to initialize the counter 142 and output by the counter 142 as the current moment of reconstructed application time 144. The frequency of transmission of application clock references 134 and, therefore, the frequency of initialization of the counter 142 is discretionary with service provider. However, if there is a discontinuity of application time the counter 142 must be re-initialized to the correct application time. Once initialized, the counter 142 is incremented by the triggering signal 128 at the time unit frequency or resolution of the application clock. The application time 144 is passed from the application time recovery unit 76 to the data presentation engine 78.

The data access units of the ancillary data stream are recovered and decoded in the data access unit decoder 70. The data access units are passed to the data presentation engine 78 where the value of the correlating application time moment in the eventACR field 112 is compared to the values of the reconstructed application time produced by the application time recovery unit 76. When the reconstructed application time and the correlating application time moment for the event correspond, the application causes the data presentation engine 78 to instigate the event. Since the event is instigated in response to the correspondence of the correlating application time and a moment of the reconstructed application time, the data specifying the correlating application time can be transmitted to the receiver in an asynchronous data stream and delivered as pre-cached or pre-loaded data in anticipation of that moment of the reconstructed application time. Since the application time clock is temporally correlated or synchronized to the system time clock through the PTSs, instigation of the event at the correlating application time moment synchronizes the instigation with an instant of the audio, visual or other program content being presented in response to a system time stamp. The event may cause data to be presented to the user by the presentation system 66 or utilized in some other manner by the receiver (for example, data might be forwarded to an auxiliary device for some action).

Figure 3:
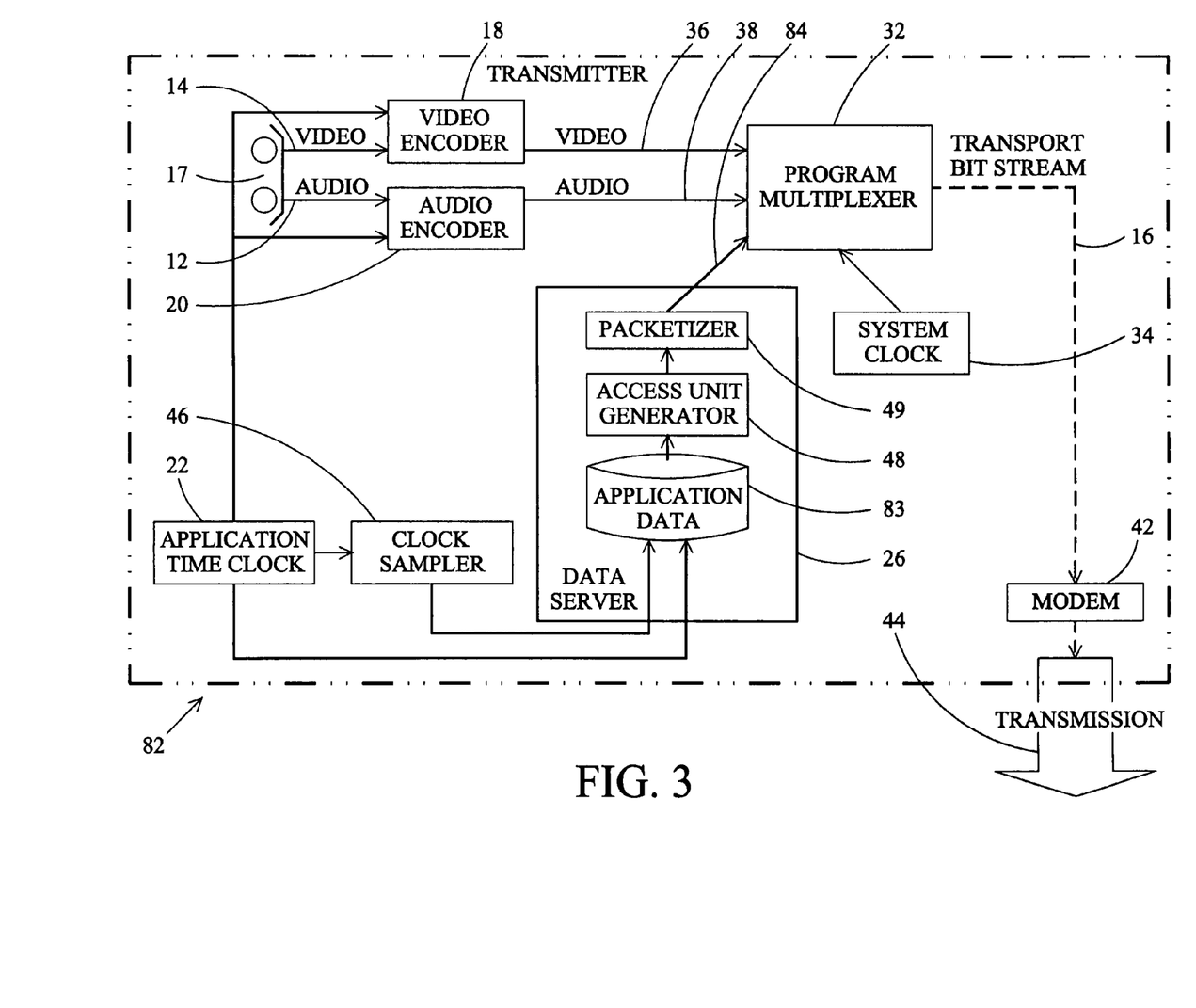
FIG. 3 is a block diagram of a digital television transmitter implementing transmission of application time samples and correlating application times in a single stream.

In a second embodiment of the invention, the application time reference and data specifying the event are embedded in an existing synchronized data elementary stream for transmission. Including all of the data in a single data elementary stream simplifies the transport bit stream 16. A transmitter 82 employing this second technique is illustrated in FIG. 3. Like or identical elements to those employed in the first embodiment are denoted by the same reference numerals. Sample application time moments, specified as application clock references, taken by the application clock sampler 46 are included in the application data 83 of a synchronized ancillary data service elementary stream as it is pushed by the data server 26. The delivery of the packets from the data server 26 to the program multiplexer 32 occurs as described above for the data packets produced by packetizer 49. In a synchronized stream, the presentation time of a data unit has a temporal relationship to the presentation times of other data units in the stream in which it is included or other streams with which that stream is synchronized. Each ACR reference descriptor 100 containing a sample application time moment or application clock reference 102 is embedded at a defined location in a data access unit with associated ancillary service data of the synchronized ancillary data service stream 84. The data access units may be conveyed either as a streaming or non-streaming synchronized data service. The video 36, audio 38, and ancillary data service 84 data are pushed to the program multiplexer 32 as described above. The elementary stream data is packetized and the value of the PTS fields specifying the system time moment for presentation of the data are set in the packet header bytes.

Referring to FIG. 4, at the receiver 90, the transport bit stream is demultiplexed 52 to recover and decode the audio 58 and video 60 data for presentation at the system clock time value specified by the PTS. The PCRs are extracted from the transport data stream and the system clock is recovered. The ancillary data service data access units are recovered and re-assembled in the data access unit acquisition buffer 92.

Embedded ACR reference descriptors 100 containing the application clock references (ACR_Reference) 102 and corresponding PTSs are recovered from the data access units 94 and the packet header bytes, respectively. The application clock references and associated PTSs are utilized by the application clock recovery unit 76 to reconstruct the application clock and lock it to the system clock. The correlating application time moment recovered from the transport bit stream 54 is sent to the data presentation engine 78 from the data access unit acquisition buffer 92 where it is compared to the application time produced by the application time recovery unit 76. When the application time corresponds to the correlating application time moment designated by the author an application instigates the identified event 110 which is presented in association with the instant of the audio, video, or data program element having a corresponding PTS.

All the references cited herein are incorporated by reference.

The terms and expressions that have been employed in the foregoing specification are used as terms of description and not of limitation, and there is no intention, in the use of such terms and expressions, of excluding equivalents of

What is claimed is:

1. A transmitter capable of transmitting synchronization data for synchronizing information other than audio or video with at least one of audio or video, said transmitter comprising:
    (a) an application time clock that determines a rate of data entering at least one of an audio encoder or a video encoder, each sending data to a multiplexer in first and second data streams, respectively;
    (b) a 27 MHZ system clock operatively interconnected to said multiplexer;
    (c) a data server having storage storing said information other than audio or video;
    (d) a first packetizer that packetizes said information other than audio or video and sends packetized said information to said multiplexer in a third data stream separate from said first and second data streams;

(e) a clock sampler sampling said application time clock; and (f) a second packetizer, apart from said first packetizer, that packetizes samples of said application time clock and sends said packetized samples to said multiplexer in a fourth data stream separate from said first, second, and third data streams.

2. The transmitter of claim 1 where said application time clock is based on frames of video per second.

3. The transmitter of claim 1 including a modem transmitting data to a receiver capable of reconstructing both said system time clock and said application time clock.

4. The transmitter of claim 1 where said multiplexer samples said system clock to encode presentation time stamps into a transport bit stream.

5. The transmitter of claim 4 where said system clock is down-sampled to 90 KHz by only encoding the 30 most significant bits of said system clock.

6. A receiver capable of receiving synchronization data for synchronizing information other than audio or video with at least one of audio or video, said receiver comprising:

(a) a de-multiplexer receiving a transport bit stream and recovering first, second, and third data streams for reconstructing video, audio, and other than video or audio data, respectively;

(b) a first clock reconstruction unit that reconstructs a 27 MHz system clock used to synchronize said video and audio; and (c) a second clock reconstruction unit reconstructs an application time clock independent from said system clock, said application time clock used to synchronize the presentation of said information other than audio or video with at least one of said audio or video.

7. The receiver of claim 6 where said second clock reconstruction unit reconstructs said application time clock using packetized samples of said application time clock recovered from said transport bit stream.

8. The receiver of claim 6 where said second clock reconstruction unit reconstructs said application time clock using packetized samples of said application time clock and presentation time stamps sampled from said system clock, each recovered from said transport bit stream.

9. The receiver of claim 6 where said other than video or audio data is reconstructed reconstructed asynchronously from at least one of said video or audio data, and stored in a buffer for synchronous presentation with said at least one of said audio or video, synchronized using said recovered application time clock.

* * * * *

UNITED STATES PATENT AND TRADEMARK OFFICE
CERTIFICATE OF CORRECTION

PATENT NO.        : 7,174,560 B1
APPLICATION NO.   : 09/492561
DATED             : February 6, 2007
INVENTOR(S)       : Crinon It is certified that error appears in the above-identified patent and that said Letters Patent is hereby corrected as shown below:

Column 7, line 13 - change "bit steam 16" to --bit stream 16--

Column 10, line 37 - change "CONVER ( )" to --CONVERT ( )--

Column 10, line 50 - change "CONVER ( )" to --CONVERT ( )--

Column 12, line 51 - change "equivalents of" to --equivalents of the features shown and described or portions thereof, it being recognized that the scope of the invention is defined and limited only by the claims which follow.--

Column 14, line 21 (Claim 9) - change "data is reconstructed reconstructed" to --data is reconstructed--

Signed and Sealed this

Eleventh Day of November, 2008

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,174,560 B1 | Page 1 of 1 |
| APPLICATION NO. | : 09/492561 | |
| DATED | : February 6, 2007 | |
| INVENTOR(S) | : Crinon | |

It is certified that error appears in the above-identified patent and that said Letters Patent is hereby corrected as shown below:

Column 7, line 13 - change "bit steam 16" to --bit stream 16--

Column 10, line 37 - change "CONVER ( )" to --CONVERT ( )--

Column 10, line 50 - change "CONVER ( )" to --CONVERT ( )--

Column 12, line 51 - change "equivalents of" to --equivalents of the features shown and described or portions thereof, it being recognized that the scope of the invention is defined and limited only by the claims which follow.--

Column 14, line 21 (Claim 9) - change "data is reconstructed reconstructed" to --data is reconstructed--

Signed and Sealed this

Twenty-fifth Day of November, 2008

JON W. DUDAS
*Director of the United States Patent and Trademark Office*